US011731879B2

(12) United States Patent
Dunnigan et al.

(10) Patent No.: US 11,731,879 B2
(45) Date of Patent: Aug. 22, 2023

(54) APPARATUS AND METHOD OF PRODUCING ACTIVATED CARBON MATERIAL

(71) Applicant: BYGEN PTY LTD, Adelaide (AU)

(72) Inventors: Lewis Dunnigan, Glenelg (AU); Philip Kwong, Paradise (AU); Jon Adam Marshall, Myrtle Bank (AU); Benjamin Morton, Adelaide (SA)

(73) Assignee: ByGen PTY LTD, Adelaide (AU)

( * ) Notice: Subject to any disclaimer, the term of this patent is extended or adjusted under 35 U.S.C. 154(b) by 284 days.

(21) Appl. No.: 16/768,480

(22) PCT Filed: Nov. 28, 2018

(86) PCT No.: PCT/AU2018/051269
§ 371 (c)(1),
(2) Date: May 29, 2020

(87) PCT Pub. No.: WO2019/104382
PCT Pub. Date: Jun. 6, 2019

(65) Prior Publication Data
US 2020/0385273 A1 Dec. 10, 2020

(30) Foreign Application Priority Data
Nov. 30, 2017 (AU) ............................... 2017904838

(51) Int. Cl.
| | |
|---|---|
| *C01B 32/336* | (2017.01) |
| *C01B 32/39* | (2017.01) |
| *B01J 6/00* | (2006.01) |
| *C10B 47/44* | (2006.01) |
| *C10B 57/00* | (2006.01) |
| *F27B 7/08* | (2006.01) |

(Continued)

(52) U.S. Cl.
CPC ............. *C01B 32/336* (2017.08); *B01J 6/008* (2013.01); *C01B 32/39* (2017.08); *C10B 47/44* (2013.01); *C10B 57/005* (2013.01); *F27B 7/08* (2013.01); *F27B 7/14* (2013.01); *F27B 2007/027* (2013.01)

(58) Field of Classification Search
CPC .................................................... C01B 32/336
See application file for complete search history.

(56) References Cited

U.S. PATENT DOCUMENTS

| | | | | |
|---|---|---|---|---|
| 3,875,077 | A | * | 4/1975 | Sanga ..................... C10B 47/04 202/121 |
| 2016/0229697 | A1 | | 8/2016 | Adams et al. |
| 2017/0128911 | A1 | | 5/2017 | Hong et al. |

FOREIGN PATENT DOCUMENTS

| | | |
|---|---|---|
| JP | 2005298305 A1 | 10/2005 |
| WO | WO 95/23762 A1 | 9/1995 |
| WO | WO 2012/142489 A1 | 10/2012 |

OTHER PUBLICATIONS

Australian Patent Office, PCT International Search Report regarding PCT App. No. PCT/AU18/051269, dated Feb. 12, 2019.

(Continued)

*Primary Examiner* — Stuart L Hendrickson
(74) *Attorney, Agent, or Firm* — Dunlap Codding, P.C.

(57) ABSTRACT

The present invention relates to an apparatus and a method of producing activated carbon material in a reactor from carbonised material using at least in part the flue gas from another reactor pyrolytically producing the carbonised material from a feed material.

16 Claims, 3 Drawing Sheets

(51) Int. Cl.
*F27B 7/14* (2006.01)
*F27B 7/02* (2006.01)

(56) References Cited

OTHER PUBLICATIONS

European Patent Office acting as the International Search Authority; Extended European Search Report regarding European Application No. 18884506.3), dated Jul. 21, 2021.

* cited by examiner

APPARATUS AND METHOD OF PRODUCING ACTIVATED CARBON MATERIAL

TECHNICAL FIELD

The present invention relates to an apparatus and a method of producing activated carbon material. In particular, but not exclusively, the invention relates to producing activated carbon material in a reactor using at least in part the flue gas from another reactor pyrolytically producing charcoal from any carbon based material such as waste agricultural material.

BACKGROUND OF INVENTION

Activated carbon material is typically produced by the activation of charcoal, a carbonaceous compound or carbonised material derived from any carbon based material. Charcoal is traditionally produced through the heating of a carbon based feedstock (traditionally wood, coconut husk, or coal) in an environment with little or no oxygen, which results in the partial decomposition of the chemical structure of the original feedstock. This produces charcoal; a carbonaceous compound consisting of large amounts of elemental carbon of differing allotropes. When the feedstock consists of non-traditional plant or animal matter, the carbonised material is often referred to as "biochar".

Activated carbon material is typically produced using one of three following processes. Firstly, it may be produced by chemical activation of a carbon containing material using an acid, a strong base, or a salt. Secondly, it may be produced by physical activation of a carbon containing material by heating the material to high temperatures in an oxidising or partially oxidising environment, such as by inputting steam or carbon dioxide into a heated rotary kiln or fluidised bed reactor. Finally, it may be produced by a combination of the first and second activation processes.

The production of a carbonised material is typically produced on a small batch scale or on a large continuous scale in reactors, such as kilns, drums, etc., in an energy intensive manner. In an existing process for producing carbonised material such as charcoal or biochar, a carbon containing feed material is inputted into a rotary kiln or fluidized bed in an environment substantially without oxygen and is heated to pyrolytically convert the feed material to biochar. This method requires external heating to sustain, but typically results in a higher quality product.

Another common method of producing carbonised material includes using small throughput batch reactors, such as pits, stationary kilns, stationary drums, etc., in a poorly controlled manner. In an existing process for producing carbonised material such as charcoal or biochar, for example, a carbon containing feed material is inputted into a stationary kiln or drum, in an environment with limited oxygen, and is ignited to pyrolytically convert the feed material to charcoal or biochar. This method uses energy from the partial combustion of the feedstock within the reactor to sustain the process, but typically results in a lower quality product.

The production of activated carbon is also produced on either a small batch scale or a large continuous scale in reactors, such as kilns, drums, etc., in an energy intensive manner. In an existing process for producing activated carbon material, for example, a carbonised feed material, such as the above described biochar, is inputted into a fixed-bed in an environment with some oxygen (e.g. 5%) and heated to convert the feed material to activated carbon.

The heat typically required for the pyrolysis process described above is at least 250° C., but more commonly 400 to 1000° C. Where the process requires external heating, a fuel such as propane or natural gas is typically combusted to heat the kilns, resulting in an energy intensive process. Where the process does not require external heating, a lower quality, higher ash product is obtained, resulting in an inefficient process. Both of the methods exemplified above also result in significant toxic and/or harmful emissions from the process, which include, but are not limited to toxic gases from the pyrolysis process and/or particulate matter from inefficient combustion, which must be treated before being emitted to the atmosphere; thus adding further complexity to the process.

Further, the temperature typically required for the activation process listed above is 400-600° C., if low levels of oxygen gas are used, or greater than 800° C. if steam, or carbon dioxide, or a combination of the latter two are used. Thus, these existing processes for producing activated carbon are energy and resource intensive, often requiring emissions and resource recovery, adding further complexity to the processes.

SUMMARY OF INVENTION

Accordingly, one aspect of the present invention includes a method of producing activated carbon material, the method including the steps of: inputting a feed material into a first reactor; pyrolytically producing a carbonised material in the first reactor from the feed material and producing volatile gas from the first reactor; routing at least part of the volatile gas to a first combustion chamber and combusting the volatile gas therein to provide heat for the first reactor to pyrolytically produce the carbonised material, and producing flue gas from the first combustion chamber; routing at least part of the flue gas to a second reactor; inputting the carbonised material from the first reactor into the second reactor; producing an activated carbon material in the second reactor from the carbonised material using at least in part the flue gas in the second reactor; and outputting the activated carbon material from the second reactor.

Preferably, the feed material includes agricultural waste materials, such as straw, husks, and pruning waste, as these waste materials currently provide little or no value for those that produce them and require disposal. Any carbon containing material, however, can be used as a feed material, such as coal, hardwood, coconut husks, softwood, plastics, etc.

The above method converts these waste materials in a two-stage process to, firstly, carbonised material, in the form of charcoal (or biochar if non-traditional agricultural waste or materials are used), and then to activated carbon material. In the first stage of the method, the waste materials undergo pyrolysis in an oxygen deficient environment in the first reactor to convert the feed material to charcoal or biochar. At the end the first stage, the charcoal or biochar is collected in a collection vessel for other use or is fed into the second stage of the method in order to produce the activated carbon material, or a combination of the two. The biochar retains significant organic carbon and trace nutrients that make it an attractive material for improving soil quality, as well as increasing water retention in the soil, recycling of nutrients in the soil, and increasing soil carbon. The biochar is also an effective adsorbent due to its elevated internal surface area and has been shown to be effective for pollutant removal and nutrient capture (e.g. ammonia gas, hydrogen sulphide gas, water soluble pollutants, organic pollutants, etc.).

Heat is required for both the first and second stages of the above described method to produce carbonised material and activated carbon material. In an embodiment, the first reactor is heated to between 400 and 800° C. to pyrolytically produce the carbonised material and the resultant volatile gas from the first reactor. This volatile gas is then combusted to provide heat to the first reactor, resulting in hot flue gas as a by-product. This flue gas is then routed to the second reactor, and includes residual heat from the first reactor of, in some embodiments, around 400 to 800° C. and residual oxygen of around 1.0 to 20%. The residual heat and oxygen are used in the second reactor to activate the carbonised material to produce the activated carbon material. In another embodiment, further heat and oxygen is used in the second reactor to activate the carbonised material to produce the activated carbon material if required. Further, if too much oxygen or heat is present in the flue gas, another gas such as nitrogen, carbon dioxide, or water can be used to dilute the oxygen and heat content to the desired range to produce the activated carbon material.

In an embodiment, the first combustion chamber substantially surrounds the first reactor to provide heat substantially evenly for the first reactor to pyrolytically produce the carbonised material. During operation of the first reactor, volatile gasses are produced in the first reactor and are recirculated into the first combustion chamber to be mixed with air and burned. The volatile gas pyrolytically produced from the first reactor includes gasses, such as methane, hydrogen and carbon monoxide, and tars, hydrocarbons, and oils that can be burnt to provide heat for the first reactor.

In an embodiment, the method further includes inputting a gaseous fuel, such as propane, to the first combustion chamber to be combusted to provide heat for the first reactor to at least initially pyrolytically produce the carbonised material and the volatile gas. Once the first reactor is initially heated to the desired temperature range of around 400 to 800° C. to produce the volatile gas, the volatile gas is then combusted in the first combustion chamber instead of at least part of the gaseous fuel. In this way, continuous operation of the first and second reactors is largely self-sustaining after the first reactor is initially heated.

In an embodiment, the method further includes the first reactor including a conveying means conveying the feed material through the first reactor at a designated conveying speed. The designated conveying speed, feed rate into, and temperature of the first reactor are configurable to optimally produce the carbonised material with desired characteristics. Further, the time the feed material travels through the first reactor is also configurable by, for example, adjusting the conveying speed or even halting the conveying means, to optimally produce the carbonised material with desired characteristics.

In an embodiment, the method further includes outputting the carbonised material from the conveying means of the first reactor into a crusher for crushing the carbonised material into a designated particle size of crushed carbonised material. Further, the method includes outputting the crushed carbonised material from the crusher into the second reactor. The reduced particle size enables the second reactor to be more effective in producing activated carbon material due to the increased surface area of the particles. In an example, the designated particle size is 1 to 5000 μm, and the size can depend on the intended application for the produced activated carbon material. Furthermore, the method includes conveying the crushed carbonised material through the second reactor at a designated conveying speed. As above, the designated conveying speed in the second reactor is configurable to optimally produce the activated carbon material. Further, the time the carbonised material travels through the second reactor is also configurable by, for example, adjusting the conveying speed or even halting the conveying means, to optimally produce the activated carbon material with desired characteristics.

Another aspect of the present invention includes an apparatus for producing activated carbon material, the apparatus including: a first reactor for pyrolytically producing a carbonised material, having: an input port at a proximal end of the first reactor for receiving a feed material; an output port at a distal end of the first reactor for outputting a carbonised material pyrolytically produced in the first reactor from the feed material; and a volatile gas outlet for outputting volatile gas produced in the first reactor; a first combustion chamber configured to receive at least part of the volatile gas routed from the volatile gas outlet of the first reactor via a volatile gas conduit, the first combustion chamber combusting the volatile gas therein to provide heat for the first reactor to pyrolytically produce the carbonised material and producing flue gas from the first combustion chamber, wherein the first combustion chamber has a flue gas outlet for outputting the flue gas produced in the first combustion chamber; and a second reactor for producing an activated carbon material, having: an input port at a proximal end of the second reactor for receiving the carbonised material from the output port of the first reactor; a flue gas inlet for receiving at least part of the flue gas routed from the first combustion chamber from flue gas outlet of the first reactor via a flue gas conduit; and an output port at a distal end of the second reactor for outputting an activated carbon material produced in the second reactor from the carbonised material using at least in part the flue gas in the second reactor.

In an embodiment, the first combustion chamber substantially surrounds the first reactor to provide heat substantially evenly to pyrolytically produce the carbonised material. In a further embodiment, the first combustion chamber is also configured to receive liquid or gaseous fuel, such as propane or diesel, to be combusted therein to at least initially provide heat for the first reactor to pyrolytically produce the carbonised material.

In an embodiment, the first combustion chamber includes a plurality of burners disposed at intervals between the proximal end and the distal end of the first reactor to provide heat for the first reactor substantially evenly between the proximal end and the distal end of the first reactor.

Alternatively, the first combustion chamber is configured to be heated by electrical elements to provide the heat for pyrolysis, allowing for use of the volatiles gases in another process, such as to generate electricity, before the flue gasses from that process are passed into the second reactor chamber.

In an embodiment, the apparatus further includes a second combustion chamber configured to receive liquid or gaseous fuels, such as propane or diesel, to be combusted therein to at least initially provide heat for the second reactor to produce the activated carbon material in addition to residual heat from the flue gas routed from the first combustion chamber.

In an embodiment, the second combustion chamber includes a plurality of burners disposed at intervals extending between the proximal end and the distal end of the second reactor to provide heat for the second reactor substantially evenly between the proximal end and the distal end of the second reactor.

Alternatively, the second combustion chamber is configured to be heated by electrical elements, to at least initially provide heat for the second reactor to produce the activated carbon material in addition to residual heat from the flue gas routed from the first combustion chamber.

In an embodiment, the first and the second combustion chamber further include configurable gas and or liquid feeds (including, but not limited to, nitrogen, carbon dioxide, or water) to optimise combustion in the first and the second combustion chambers respectively. Further, in another embodiment, the first and second reactor includes configurable gas and or liquid feeds (including, but not limited to, nitrogen, carbon dioxide, or water) to optimise at least the oxygen in the environment in the first and second reactors, respectively.

In an embodiment, the first reactor further includes a conveying means, such as screw conveyor or conveyor belt, for conveying the feed material through the first reactor at a designated conveying speed. In another embodiment, the first reactor is a rotary kiln.

In an embodiment, the apparatus further includes a crusher for crushing the carbonised material received from the conveying means of the first reactor into a designated particle size of crushed carbonised material. In another embodiment, a crusher is located before the hopper for feeding the material of a desired particle size into the first reactor. In yet another embodiment, a crusher is placed after the second reactor to obtain a desired particle size from the second reactor.

In an embodiment, the input port of the second reactor receives the crushed carbonised material from the crusher. Further, the second reactor is disposed in the apparatus such that an internal surface of the second reactor conveys the crushed carbonised material through the second reactor at a designated conveying speed. For example, the second reactor is a rotary kiln. In another example, the second reactor is a screw conveyor. In another example, the second reactor is a belt conveyor. It will be appreciated by those persons skilled in the art that the activated carbon material produced in the rotary kiln contains an elevated internal surface area when compared to the carbonised material, such as charcoal or biochar, and the activated carbon material can be used for many adsorption type processes, such as environmental remediation, pollution control, etc.

In an embodiment, the first reactor further includes a feed hopper for receiving the feed material and for controlling flow of the feed material into the input port of the first reactor.

In an embodiment, the first reactor further includes a first airlock between the feed hopper and the input port of the first reactor, a second airlock between the output port of the first reactor and the input port of the second reactor to control flow of gas to and from the first reactor to pyrolytically produce the carbonised material in the first reactor, and a third airlock after the output port of the second reactor to control the flow of gas to and from the second reactor to activated the carbonised material in the second reactor. For example, these air locks are rotary air locks or a series of gates.

In an embodiment, the apparatus further includes a first solid mass sensor adjacent the input port of the first reactor, whereby the first solid mass sensor is configured to monitor flow of the feed material into the first reactor. Also, the apparatus further includes a second solid mass sensor adjacent the input port of the second reactor, whereby the second solid mass sensor is configured to monitor flow of the carbonised material into the second reactor. Further, the apparatus includes a third solid mass sensor adjacent the output port of the second reactor, whereby the third solid mass sensor is configured to monitor flow of the activated carbon material from the second reactor. That is, the first, second and third solid mass sensors are configured to monitor flow of solid mass to and from the first and the second reactor.

The first, second and third solid mass sensors may be in the form of solid mass meters and are configured to allow for effective control of the apparatus as well as condition monitoring and quality control. In an example, the solid mass meters use centripetal force mass flow technology to determine the solid mass flow to and from the first and second reactor. Alternatively, the solid mass flow meters may be microwave Doppler units, ultrasonic Doppler units, or impact force mass meters.

In an embodiment, the flue conduit includes a module configured to remove or convert undesired gases in the flue gas to prevent entry of the undesired gasses into the second reactor.

Another aspect of the present invention includes a controller configured to control the above described apparatus for producing activated carbon material.

Another aspect of the present invention includes software which when executed by a controller implements the above described method.

In an embodiment, the apparatus includes a plurality of sensors, such as the above first, second and third solid mass sensors, which inform the controller (or controllers) and or the software such that operation of the apparatus is autonomous or semi-autonomous, adjusting for conditions including, but not limited to, the temperature of the first and second reactors, the speed of the conveying means in the first and second reactors, the oxygen concentration within the first and second reactors, the flue gas flow rate in the second reactor, and the flow of solid mass in the form of feed material, carbonised material, and activated carbon material.

BRIEF DESCRIPTION OF DRAWINGS

In order that the invention can be more clearly understood, examples of embodiments will now be described with reference to the accompanying drawings, in which.

DETAILED DESCRIPTION

Figure 1:
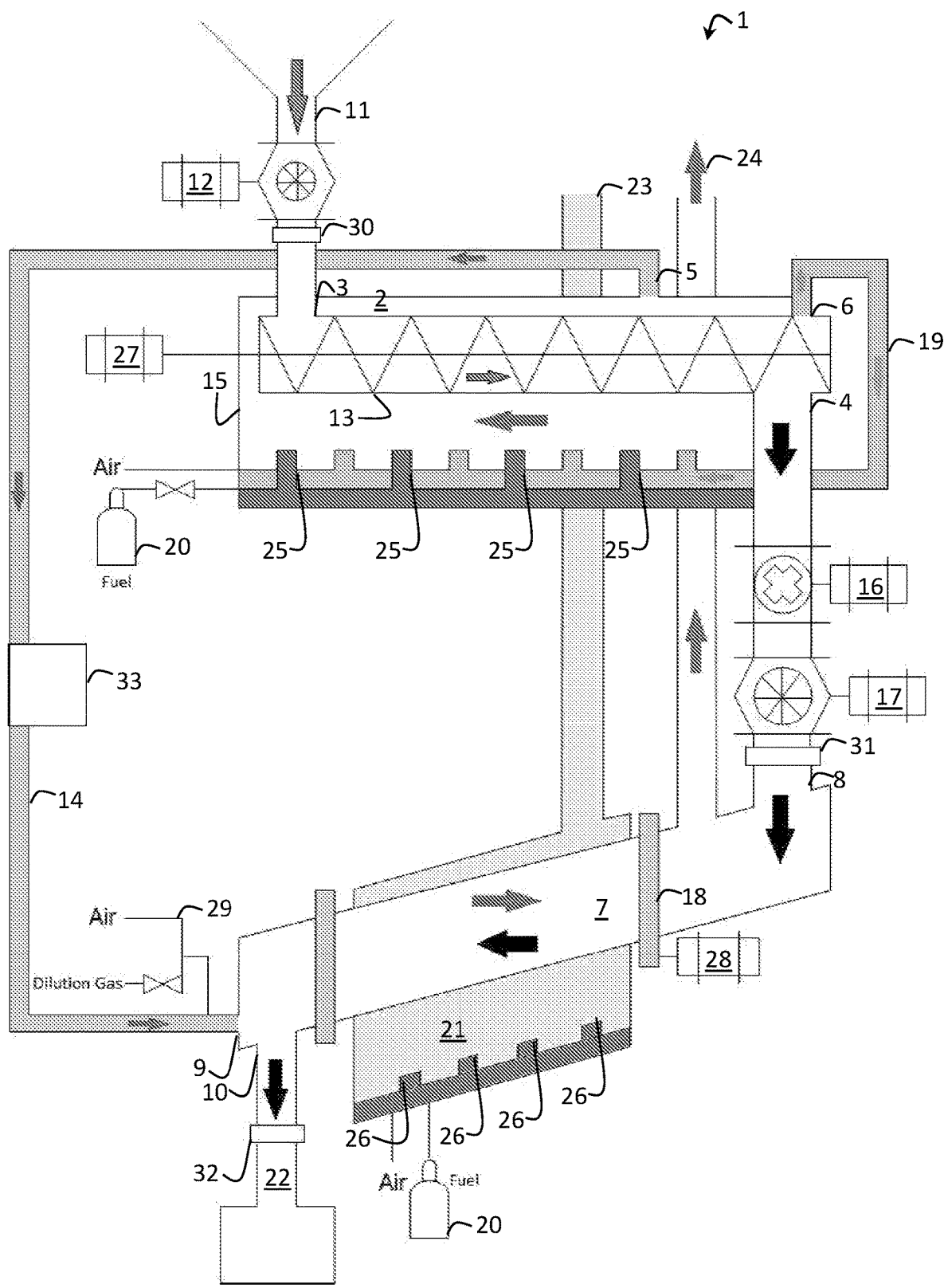
FIG. 1 shows a representation of an apparatus for producing activated carbon material, according to an embodiment of the invention.

According to an embodiment of the present invention, an apparatus 1 for producing activated carbon material is shown in FIG. 1. The apparatus 1 includes a first reactor 2 for pyrolytically producing a carbonised material from inputted feed material. As described above, preferably the feed material is agricultural waste material, such as rice husks and grape pruning material, and the carbonised material is biochar. It will be appreciated by those persons skilled in the art that any carbon rich can be used as feed material for this process. Existing processes typically use hardwood, coal, pecan shell, or coconut husk. Other potential feedstocks include paper, cardboard, or plastics. The carbonised material will hereinafter be referred to as biochar, but it will be appreciated that other carbonised materials such as charcoal can be produced by the apparatus 1.

The apparatus 1 has an input port 3 at a proximal end of the first reactor 2 for receiving the feed material, such as rice husks, and an output port 4 at a distal end of the first reactor 2 for outputting biochar pyrolytically produced in the first reactor 2 from the feed material. To convey the feed material though the first reactor 2, a conveying means in the form of a screw conveyor 13 is used for conveying the feed material through the first reactor 2 at a designated conveying speed for sufficient pyrolysis to take place to the feed material. For example, the screw conveyor 13 is configured to convey the feed material through the screw conveyor 13 for 20 to 40 minutes. Also, the first reactor 2 includes a stainless steel pipe with the screw conveyor 13 disposed therein. The screw conveyor 13 is powered by motor 27 and conveys the feed material through the pipe with a minimum residence time of around 15 minutes in the heated and oxygen deprived environment for pyrolysis of the feed material to take place. The maximum amount of oxygen in the environment is around 2%.

The first reactor 2 also has a volatile gas outlet 6 for outputting the volatile gas produced in the first reactor 2 during the pyrolysis of the feed material, via volatile gas conduit 19, to a first combustion chamber 15. As described above, the volatile gas includes hydrogen, methane, carbon dioxide, carbon monoxide, as well as aliphatic and aromatic hydrocarbons (the condensable fraction of which is called "bio-oil"). In an embodiment not shown in FIG. 1, the volatile gas can be separated into the condensable (bio-oil) and non-condensable fractions, with the former being collected and removed for other uses, and the latter being combusted to provide heat for the first reactor 2. In the embodiment, the entire volatile gas mix (both condensable and non-condensable fractions) is combusted to provide heat for the first reactor 2.

That is, the first combustion chamber 15 is configured to receive at least part of the volatile gas routed from the first reactor 2 via the volatile gas conduit 19 and combusts the volatile gas to provide heat for the first reactor to pyrolytically produce the biochar and the flue gas. The first combustion chamber 15 has a flue gas outlet 5 for outputting the flue gas produced in the first combustion chamber 2, which is used at least in part in a second reactor 7 for producing activated carbon material from the biochar. The flue gas has residual heat from the combustion of the volatile gas that is used at least in part in the second reactor 7 for producing activated carbon material from the biochar.

The second reactor 7 has an input port 8 at a proximal end of the second reactor 7 for receiving the biochar from the output port 4 of the first reactor 2 and a flue gas inlet 9 for receiving the flue gas routed from the first combustion chamber 15 via a flue gas conduit 14. In the embodiment, the residual heat is around 200 to 800° C. and the residual oxygen is around 1.5 to 15% so that the biochar can be activated to convert it to activated carbon material in the second reactor 7. The temperature of the second reactor 7 can be adjusted by adjusting the volatile gas combustion rate in the first combustion chamber 15. Also, the air level for the volatile gas combustion can be adjusted and monitored to control the oxygen level in the second reactor 7.

The second reactor 7 has an output port 10 at a distal end of the second reactor for outputting the activated carbon material produced in the second reactor 7 to collection vessel 22. In the embodiment, the second reactor 7 is a rotary kiln 18 heated to 200 to 800° C. via the residual heat in the flue gas, and is disposed in the apparatus 1 in such a manner that an internal surface of the rotary kiln 18 conveys the biochar through the second reactor 7 under gravity at a designated conveying speed during rotation of the rotary kiln 18. The rotation of the rotary kiln 18 is provided by motor 28.

At the end of the screw conveyor 13 of the first reactor 2, the biochar produced drops under gravity through the output port 4 of the first reactor 2 to either a collection vessel if the biochar is to be harvested or is fed into the second reactor 7 via the input port 8 to produce the activated carbon material. The apparatus 1 can therefore be switched between, or co-produce, biochar and activated carbon material.

Further, the apparatus 1 includes a feed hopper 11 for receiving the feed material for the first reactor 2 and for controlling flow of the feed material into the input port 3 of the first reactor 2 via a chute. The apparatus 1 further includes a first rotary airlock 12 between the feed hopper 11 and the input port 3 of the first reactor 2 to control the flow of gas into the first reactor, and a second rotary airlock 17 between the output port 4 of the first reactor 2 and the input port 8 of the second reactor 7 to control flow of gas to and from the first reactor 2 to pyrolytically produce the carbonised material in the first reactor 2. That is, the first 12 and second 17 rotary airlocks provide the above described oxygen deprived environment for the pyrolysis of the feed material to produce biochar by preventing air or activation gas from entering the first reactor 2, as well as preventing volatile gasses escaping the first reactor 2.

Specifically, the first rotary airlock 12 controls the feed rate of the feed material passing from the hopper 11 into the input port 3 of the first reactor 2, prevents atmosphere outside of the apparatus 1 from entering into the input port 3 of the first reactor 2, and prevent volatile gases produced in the first reactor 2 from exiting from the input port 3 of the first reactor 2 back into the feed hopper 11. The second rotary airlock 17 between the output port 4 of the first reactor 2 and the input port 8 of the second reactor 7 to control both the flow of carbonised material into the input port 8 of the second reactor 7 as well as to prevent the interchange of gases between the outlet port 4 of the first reactor 2 and the input port 8 of the second reactor 7.

Further, the apparatus 1 includes a first solid mass flow sensor in the form of a meter 30 between the first rotary air lock 12 and the input port 3 of the first reactor 2 to monitor the flow of solids (i.e. feed material) into the first reactor 2, and a second solid mass flow sensor in the form of a meter 31 between the second rotary airlock 17 and the input port 8 of the second reactor 7 to monitor the flow of solids (i.e. carbonised material) out of the first reactor 2 and into the second reactor 7, and a third solid mass flow sensor in the form of a meter 32 between the output port 10 of the second reactor 7 and the collection vessel 22 to monitor the flow of solids (i.e. activated carbon material) out of the second reactor 7 and into the collection vessel 22. That is, the first 30, second 31, and third 32 solid mass flow meters provide the ability to monitor the flow of solids through the apparatus 1.

As mentioned, the first combustion chamber 15 is configured to receive at least a part of the volatile gas routed from the volatile gas outlet 6 of the first reactor 2 via the second volatile gas conduit 19. In the embodiment, the first combustion chamber 15 substantially surrounds the first reactor 2 to substantially evenly provide heat for the first reactor 2 to pyrolytically produce the biochar. The volatile gasses include gasses such as hydrogen, methane and carbon monoxide that can be burnt in the presence of air or additional oxygen to provide heat. In addition, the first combustion chamber 15 is further configured to receive fuel, such as a propane, natural gas or oil, or diesel, to be combusted to at least initially provide heat for the first reactor 2 to pyrolytically produce the biochar. After the process has been initialised, the first combustion chamber 15 combusts the resultant volatile gas from the first reactor 2 so that the pyrolytic production of biochar is largely self-sustaining. Nonetheless, combustible fuel gas can be inputted and combusted in the first combustion chamber 15 when the heat generated from combusting the volatile gas is no longer in a designated temperature range for the first reactor 2, such as between 400 and 800° C.

In an embodiment, the heat required for the first reactor 2 is around 600° C. and during continuous, self-sustaining operation of the, first reactor 2, the volatile gas produced in the first reactor 2 is mixed with air and burned in the first combustion chamber 15 with the external fuel supply turned off. To heat the first reactor 2 substantially evenly from its distal end to its proximal end, the first combustion chamber 15 includes a plurality of burners 25 disposed at substantially even intervals between the proximal end and the distal end of the first reactor 2 to burn the inputted gasses. The volatile gasses that are generated inside the first reactor 2 are recirculated via the volatile gas conduit 19 to the burners 25 in the first combustion chamber 15 that substantially surrounds the pipe of the screw conveyor 13 of the first reactor 2. The burners 25 of the first combustion chamber 15 use a venturi principle to better combust the gas given the low-pressure of the volatile gas.

In an embodiment, the heat required for the second reactor 7 is between 400 and 500° C. and this heat is provided at least in part from residual heat in the flue gas from the first reactor 2. If this residual heat is not adequate, the apparatus 1 includes a second combustion chamber 21 configured to receive liquid or gaseous fuel, such as propane, natural gas or oil, or diesel, to be combusted to provide the required heat for the second reactor 7 to produce activated carbon material. Like the first combustion chamber 15, the second combustion chamber 21 includes a plurality of burners 26 disposed at substantially even intervals between the proximal end and the distal end of the rotary kiln 18 to burn the inputted fuel to provide heat for the rotary kiln 18 substantially evenly between the proximal end and the distal end of the rotary kiln 18. Also, the temperature of the second reactor 7 can be adjusted by adjusting the combustion rate in the second combustion chamber 21.

The first 15 and the second 21 combustion chambers further include configurable gas feeds 20 to optimise combustion in the first 15 and the second 21 combustion chambers, respectively. Specifically, the fuel feeds 20 can be mixed with the volatile gas provided via the volatile gas conduit 19 and or fuel gasses in the first combustion chamber 15 to provide a fuel air mixture that ensures that the heat provided is adequate to produce biochar. In the second combustion chamber 21, the fuel feeds 20 can be mixed with fuel gasses to provide a fuel air mixture that ensures that the heat provided is adequate to produce activated carbon material.

The flue gas conduit 14 has a configurable gas feed 29—air and dilution gas, such as nitrogen, carbon dioxide, or water—to provide the designated oxygen content (e.g. 5%) to produce activated carbon if the oxygen content in the flue gas is not within the designated range of around 1.5 to 15%. This dilution gas may also be used to reduce the temperature of the flue gas if it is not within the designated range of around 350-450° C.

The flue gas conduit 14 also contains a module 33 to clean up any undesired gasses in the flu gas which may damage components contained in the second reactor 7, or hinder the activation process. These undesired gases may be, but are not limited to, sulphur containing compounds (e.g. $SO_x$, $H_2S$, etc.), nitrogen containing compounds (e.g. $NO_x$, $NH_3$, etc.), carbon monoxide, cyanides, etc.

The apparatus 1 further includes a crusher 16 for crushing the biochar received from the output port 4 of the first reactor 2 into a designated particle size of crushed biochar. The input port 8 of the second reactor 7 receives the crushed biochar from the crusher 16 via the second rotary airlock 17 and past the second solid mass meter 31. The second rotary airlock 17 controls the feed rate of crushed biochar into the rotary kiln 18 and prevents the activation gases from the second reactor 7 getting into the first reactor 2, or volatile gases from the first reactor 2 from getting into the second reactor 7.

The designated particle size of the crushed biochar is 1 to 5000 µm, depending on the end application of the activated carbon and the specifications of the rotary kiln 18. The reduction in particle size also allows the activation of the biochar in the rotary kiln 18 to be more effective due to increased surface area. As mentioned, the second reactor 7 is disposed in the apparatus 1 such that an internal surface of the rotary kiln 18 conveys the biochar through the rotary kiln 18 under gravity at a designated conveying speed during rotation. The reduced particle size of crushed biochar enables the conveying of the crushed biochar to be more consistent throughout the rotary kiln 18 to better produce activated carbon.

Also as mentioned, the residual heat and oxygen of the recirculated flue gas is used at least in part to activate the crushed biochar. Once activation of the crushed biochar is complete in the rotary kiln 18, the activated carbon material drops into a collection vessel 22 via the output port 10 of the second reactor 7. Activation of the crushed biochar in the rotary kiln 18 generally takes 20 to 60 minutes, depending on the heat of the rotary kiln 18, oxygen content in the flue gas, particle size of the crushed biochar, and chemical and morphological characteristics of the crushed biochar.

In the embodiment, the second combustion chamber 21 also includes a secondary flue gas output 23 to emit flue gas generated from combustion of fuel such as propane in the second combustion chamber 21. Also, the second reactor 7 has a chimney 24 to vent spent activation gas in the second reactor 7 to atmosphere or to be used for additional heat requirements of other systems. One such system includes a drying chamber to dry the feed material before it is inputted into the hopper 11 using the residual heat from the flue gas from the second combustion chamber 21 via the secondary flue gas output 23 and/or the gas from the chimney 24. In addition, or in the alternative, the drying chamber uses residual heat from the flue gas from the first combustion chamber 15. In addition, or in the alternative, the flue gas from the secondary flue output 23 and/or in part the gas from the chimney 24 can be fed back into the flue conduit 14 should additional flue gas, temperature, oxygen, or dilution be required during the activation stage within the second reactor 7.

It will be appreciated by those persons skilled in the art that the amount of heat that is vented will depend on the throughput and the moisture content of the feed material in the first reactor 2. It will also be appreciated that any toxic gasses emitted from the second reactor 7 are processed before being emitted to atmosphere if required.

An example of rice husk and grape pruning material being used as a feed material for biochar production using the first reactor 2 of the apparatus 1 is now described. Specifically, Table 1 shows details of the feedstocks and the biochar produced from the pyrolysis of rice husk and grape pruning.

TABLE 1

Proximate and ultimate analysis of the grape pruning (GP) and rice husk (RH) and ultimate analysis of biochar derived between 400-800° C.

| wt. % | Moisture | Volatile Matter | Fixed Carbon | Ash | Carbon | Hydrogen | Nitrogen | Sulfur | Oxygen* |
|---|---|---|---|---|---|---|---|---|---|
| Raw Feedstock | | | | | | | | | |
| RH | 9.20 | 51.3 | 18.4 | 21.5 | 38.1 | 5.00 | 0.26 | 0.52 | 56.1 |
| GP | 6.79 | 65.4 | 21.0 | 6.67 | 49.2 | 6.69 | 0.98 | 0.27 | 42.9 |
| Biochar | | | | | | | | | |
| $RH_{400}$ | — | — | — | 47.3 | 43.0 | 2.21 | 0.47 | 0.41 | 53.9 |
| $RH_{500}$ | — | — | — | 50.3 | 43.5 | 1.92 | 0.30 | 0.13 | 54.2 |
| $RH_{600}$ | — | — | — | 53.8 | 43.4 | 1.58 | 0.30 | 0.09 | 54.6 |
| $RH_{700}$ | — | — | — | 54.0 | 41.6 | 1.19 | 0.35 | 0.01 | 56.9 |
| $RH_{800}$ | — | — | — | 55.7 | 41.7 | 1.19 | 0.37 | 0.00 | 56.7 |
| $GP_{400}$ | — | — | — | 18.5 | 68.6 | 4.56 | 1.50 | 0.18 | 25.2 |
| $GP_{500}$ | — | — | — | 20.3 | 72.9 | 3.64 | 1.46 | 0.14 | 21.9 |
| $GP_{600}$ | — | — | — | 23.8 | 79.2 | 2.68 | 1.43 | 0.10 | 16.6 |
| $GP_{700}$ | — | — | — | 24.9 | 77.4 | 1.76 | 1.26 | 0.06 | 19.6 |
| $GP_{800}$ | — | — | — | 29.9 | 81.1 | 1.16 | 1.44 | 0.03 | 16.3 |

*Dry/ash free basis.

Figure 3:
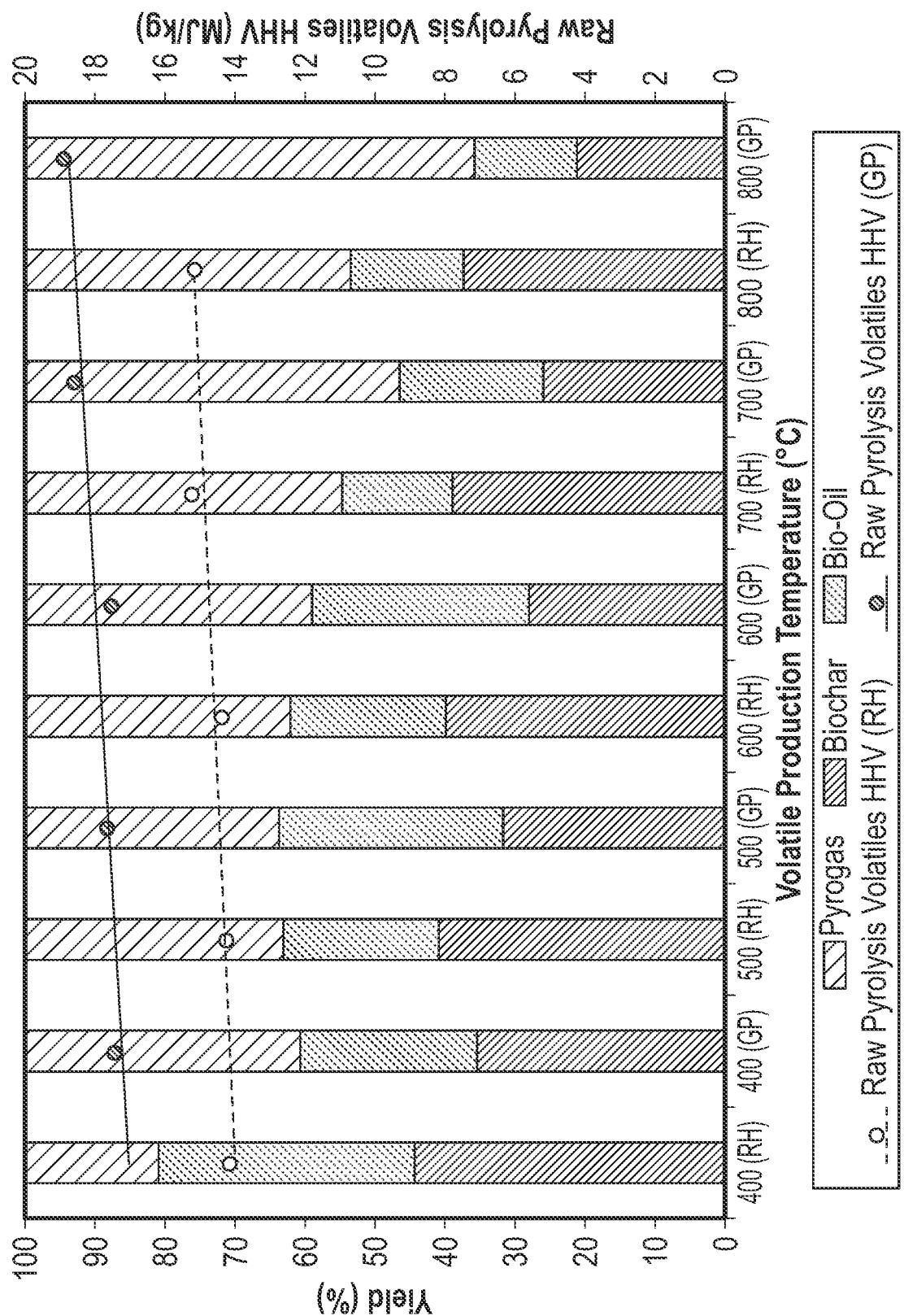
FIG. 3 shows a graph of first reactor product yields, in the form of non-condensable fraction (pyrogas), biochar and condensable fraction (bio-oil), at different temperatures.

FIG. 3 shows the first reactor 2 product yields, in the form of non-condensable fraction (pyrogas), biochar and condensable fraction (bio-oil), at different temperatures.

Table 2 shows the composition of the non-condensable (pyrogas) fraction of the resultant pyrolysis volatile gas from the production of biochar from grape pruning and rice husks in the first reactor 2.

TABLE 2

Composition of the pyrogas fraction of raw pyrolysis volatiles produced from the grape pruning (GP) and rice husk (RH) between 400-800° C.

| Component | 400° C. | 500° C. | 600° C. | 700° C. | 800° C. |
|---|---|---|---|---|---|
| GP (vol %) | | | | | |
| $H_2$ | 0.4 | 3.4 | 10.3 | 14.6 | 14.4 |
| CO | 14.5 | 11.6 | 10.0 | 10.2 | 14.8 |
| $CO_2$ | 33.1 | 29.0 | 21.5 | 15.8 | 11.2 |
| $CH_4$ | 2.0 | 6.0 | 8.3 | 9.3 | 9.6 |
| HHV (MJ/kg) | 1.8 | 3.1 | 4.7 | 6.0 | 6.8 |
| RH (vol %)* | | | | | |
| $H_2$ | 0.6 | 2.1 | 5.4 | 9.3 | 9.6 |
| CO | 20.4 | 20.4 | 24.3 | 25.2 | 21.9 |
| $CO_2$ | 26.8 | 17.7 | 12.3 | 9.4 | 9.0 |
| $CH_4$ | 1.5 | 3.7 | 3.8 | 3.1 | 5.9 |
| HHV (MJ/kg) | 2.3 | 3.2 | 4.2 | 4.7 | 5.4 |

An example of grape vine pruning and derived biochar being used for activated carbon production using the second reactor 7 of the apparatus 1 is now described. Specifically, Table 3 shows details of the yield of the activated carbon produced using at least in part the oxygen at different percentages in the flue gas in the second reactor 7. Table 3 shows a reduction in overall yield with increasing oxygen concentration at an activation temperature of 400° C.

On this parameter alone, it would be preferable to use a lesser amount of oxygen during activation. However, as Table 4 below shows, increased oxygen concentrations increase pore volume and total surface oxygen concentration of the activated carbon, with both these parameters are necessary for making quality activated carbon material.

TABLE 3

Physical properties of grapevine cane feedstock, biochar, and activated carbon (AC) by activation with oxygen/simulated flue gas.

| Sample | Yield (%) | Burn-off (%) | Carbon | Hydrogen | nitrogen | Volatiles | Fixed Carbon | Ash |
|---|---|---|---|---|---|---|---|---|
| Grapevine Cane | — | — | 45.2 | 8.8 | 0.8 | 73.6 | 22.3 | 4.17 |
| Biochar | 30.2 | — | 76.7 | 2.8 | 1.4 | 11.0 | 81.9 | 7.08 |
| 2.5% $O_2$ + 15% $CO_2$ AC | 23.1 | 23.4 | 77.1 | 2.4 | 1.9 | 17.1 | 71.7 | 11.1 |
| 5% $O_2$ + 15% $CO_2$ AC | 18.5 | 38.8 | 66.7 | 2.5 | 2.3 | 21.3 | 67.0 | 11.7 |
| 5% $O_2$ AC | 18.0 | 40.4 | 64.3 | 2.4 | 2.3 | 23.1 | 65.3 | 11.7 |
| 7.5% $O_2$ + 15% $CO_2$ AC | 15.3 | 49.3 | 60.5 | 2.5 | 2.5 | 24.4 | 62.9 | 12.7 |

TABLE 4

Surface characteristics of grapevine cane biochar, and activated carbon

| Sample | BET Surface Area ($m^2/g$) | NLDFT Pore Volume (mL/g) | Amount desorbed $CO_2$ (μmol/g) | Amount desorbed CO (μmol/g) | Amount desorbed total (μmol/g) |
|---|---|---|---|---|---|
| Grapevine Cane Biochar | below detection | below detection | 56 | 107 | 163 |
| 2.5% $O_2$ + 15% $CO_2$ AC | 476 | 0.200 | 111 | 195 | 306 |
| 5% $O_2$ + 15% $CO_2$ AC | 503 | 0.213 | 161 | 275 | 436 |
| 5% $O_2$ AC | 487 | 0.216 | 155 | 234 | 389 |
| 7.5% $O_2$ + 15% $CO_2$ AC | 488 | 0.241 | 197 | 256 | 453 |

Figure 2:
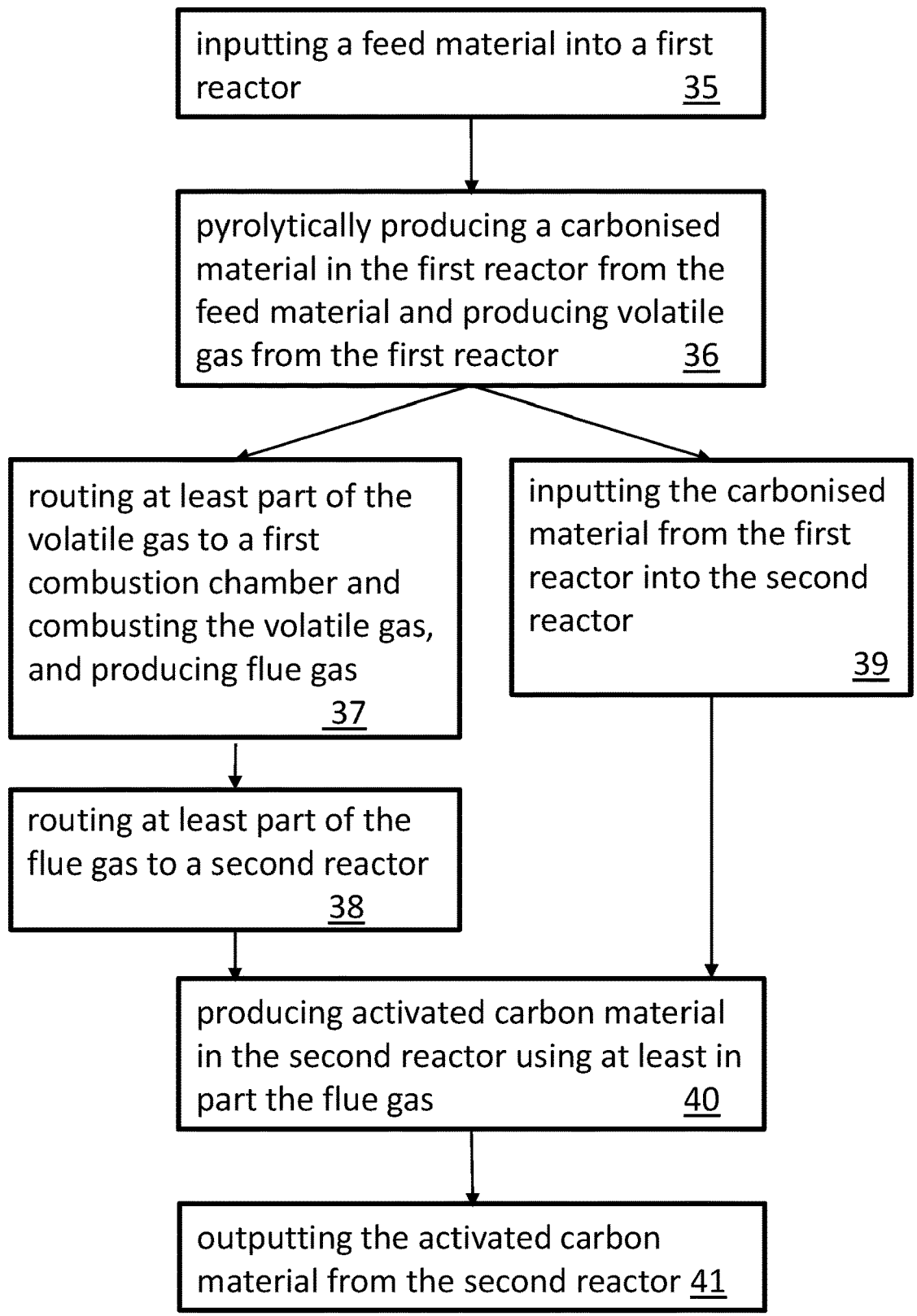
FIG. 2 shows a flow chart of a method of producing activated carbon material, according to an embodiment of the invention.

Referring now to FIG. 2, there is shown a summary of a flow chart of a method 34 of producing activated carbon material. The method 34 including the steps of: inputting 35 a feed material into a first reactor; pyrolytically producing 36 a carbonised material in the first reactor from the feed material and producing volatile gas from the first reactor; routing 37 at least part of the volatile gas to a first combustion chamber and combusting the volatile gas therein to provide heat for the first reactor to pyrolytically produce the carbonised material, and producing flue gas from the first combustion chamber; routing 38 at least part of the flue gas to a second reactor; inputting 39 the carbonised material from the first reactor into the second reactor; producing 40 an activated carbon material in the second reactor from the carbonised material using at least in part the flue gas in the second reactor; and outputting 41 the activated carbon material from the second reactor.

In addition, it will be appreciated by those persons skilled in the art that further aspects of the method will be apparent from the above description of the apparatus 1. Further, the persons skilled in the art will also appreciate that at least part of the method could be embodied in software (e.g. program code) that is implemented by a controller (not shown) configured to control the apparatus 1 for producing activated carbon material. The software could be supplied in a number of ways, for example of a tangible computer readable medium, such as a disc or a memory.

Those skilled in the art will also appreciate that the invention described herein is susceptible to variations and modifications other than those specifically described. It is to be understood that the invention includes all such variations and modifications.

The discussion of documents, acts, materials, devices, articles and the like is included in this specification solely for the purpose of providing context for the present invention. It is not suggested or represented that any of these matters formed part of the common general knowledge relevant to the prevent invention as it existed before the priority date of each claim of this application

The invention claimed is:

1. A method of producing activated carbon material, the method including the steps of:

heating a first reactor substantially evenly with heat produced in a first combustion chamber substantially surrounding the first reactor;

inputting a feed material into the first reactor through an input port at a proximal end of the first reactor;

pyrolytically producing a carbonised material in the first reactor from the feed material and producing volatile gas from the first reactor;

routing at least part of the volatile gas through a volatile gas outlet to a first combustion chamber and combusting the volatile gas therein to provide heat for the first reactor to pyrolytically produce the carbonised material, and producing flue gas from the first combustion chamber;

routing, via a flue gas conduit, at least part of the flue gas produced in the first combustion chamber through a flue gas outlet of the first combustion chamber to a flue gas inlet of a second reactor to heat the second reactor to 400 to 500° C. via residual heat in the flue gas;

providing a designated oxygen content in the flue gas to produce an activated carbon material in the second reactor if the oxygen content in the flue gas is not within a designated range by:

sensing oxygen concentration in the second reactor; and controlling a control valve of a configurable gas or liquid feed based upon a sensed oxygen level content in the flue gas in the second reactor;

passing the carbonized material through an output port at a distal end of the first reactor wherein the carbonised material drops under gravity through the output port into a collection vessel if the carbonised material is to be harvested or into an input port at a proximal end of a second reactor to produce an activated carbon material, or a combination of both;

producing the activated carbon material in the second reactor from the carbonised material using at least in part the flue gas in the second reactor and rotating the second reactor whereby an internal surface of the second reactor conveys the carbonised material under gravity at a designated conveying speed during rotation of the second reactor; and outputting the activated carbon material from the second reactor through an output port at a distal end of the second reactor.

2. An apparatus for producing activated carbon material, the apparatus including:

a first reactor for pyrolytically producing a carbonised material, having:

an input port at a proximal end of the first reactor for receiving a feed material;

an output port at a distal end of the first reactor for outputting a carbonised material pyrolytically produced in the first reactor from the feed material, wherein the carbonised material drops under gravity through the output port to a collection vessel if the carbonised material is to be harvested or into a second reactor to produce an activated carbon material, or a combination of both; and a volatile gas outlet for outputting volatile gas produced in the first reactor;

a first combustion chamber configured to receive at least part of the volatile gas routed from the volatile gas outlet of the first reactor via a volatile gas conduit, the first combustion chamber combusting the volatile gas therein to provide heat for the first reactor to pyrolytically produce the carbonised material and producing flue gas from the first combustion chamber, wherein the first combustion chamber has a flue gas outlet for outputting the flue gas produced in the first combustion chamber;

the second reactor for producing an activated carbon material, having:

an input port at a proximal end of the second reactor for receiving the carbonised material from the output port of the first reactor;

a flue gas inlet for receiving at least part of the flue gas routed from the first combustion chamber from flue gas outlet of the first reactor via a flue gas conduit;

an output port at a distal end of the second reactor for outputting the activated carbon material produced in the second reactor from the carbonised material using at least in part the flue gas in the second reactor, the flue gas conduit connecting the flue gas outlet of the first combustion chamber to the flue gas inlet of the second reactor, wherein the second reactor is a rotary kiln heated to 400 to 500° C. via the residual heat in the flue gas, and an internal surface of the rotary kiln conveys the carbonised material under gravity at a designated conveying speed during rotation of the rotary kiln; and a sensor sensing oxygen concentration in the second reactor, wherein the flue gas conduit includes a configurable gas or liquid feed having a control valve to provide a designated oxygen content in the flue gas to produce the activated carbon material in the second reactor if the oxygen content in the sensed oxygen level content in the flue gas in the second reactor is not within a designated range, and wherein the first combustion chamber substantially surrounds the first reactor to provide heat substantially evenly for the first reactor to pyrolytically produce the carbonised material.

3. An apparatus as claimed in claim 2, wherein the flue gas conduit includes a module configured to remove or convert undesired gasses in the flue gas to prevent entry of the undesired gasses into the second reactor.

4. An apparatus as claimed in claim 2, wherein the first combustion chamber is further configured to receive liquid or gaseous fuel to be combusted therein to at least initially provide heat for the first reactor to pyrolytically produce the carbonised material.

5. An apparatus as claimed in claim 4, wherein the first combustion chamber includes a plurality of burners disposed at intervals between the proximal end and the distal end of the first reactor to provide heat for the first reactor substantially evenly between the proximal end and the distal end of the first reactor.

6. An apparatus as claimed in claim 2, further including a second combustion chamber configured to receive liquid or gaseous fuel to be combusted therein to at least initially provide heat for the second reactor to produce the activated carbon material in addition to residual heat from the flue gas routed from the first combustion chamber.

7. An apparatus as claimed in claim 6, wherein the second combustion chamber includes a plurality of burners disposed at intervals extending between the proximal end and the distal end of the second reactor to provide heat for the second reactor substantially evenly between the proximal end and the distal end of the second reactor.

8. An apparatus as claimed in claim 2, wherein the apparatus further includes a first solid mass sensor adjacent the input port of the first reactor, whereby the first solid mass sensor is configured to monitor flow of the feed material into the first reactor.

9. An apparatus as claimed in claim 8, wherein the apparatus further includes a second solid mass sensor adjacent the input port of the second reactor, whereby the second solid mass sensor is configured to monitor flow of the carbonised material into the second reactor.

10. An apparatus as claimed in claim 9, wherein the apparatus further includes a third solid mass sensor adjacent the output port of the second reactor, whereby the third solid mass sensor is configured to monitor flow of the activated carbon material from the second reactor.

11. An apparatus as claimed in claim 2, wherein the first reactor further includes a conveying means for conveying the feed material through the first reactor at a designated conveying speed.

12. An apparatus as claimed in claim 11, wherein the conveying means is a screw conveyor, rotary kiln, or belt conveyor.

13. An apparatus as claimed in claim 11, further including a crusher for crushing the carbonised material received from the conveying means of the first reactor into a designated particle size of crushed carbonised material.

14. An apparatus as claimed in claim 13, wherein the input port of the second reactor receives the crushed carbonised material from the crusher.

15. An apparatus as claimed in claim 2, wherein the first reactor further includes a feed hopper for receiving the feed material and for controlling flow of the feed material into the input port of the first reactor.

16. An apparatus as claimed in claim 15, wherein the first reactor further includes a first airlock between the feed hopper and the input port of the first reactor, a second airlock between the output port of the first reactor and the input port of the second reactor to control flow of gas to and from the first reactor to pyrolytically produce the carbonised material in the first reactor, and a third airlock between the output port of the second reactor and a collection vessel to control flow of gas to and from the second reactor to activate the carbonised material to produce activated carbon in the second reactor.

* * * * *

UNITED STATES PATENT AND TRADEMARK OFFICE
CERTIFICATE OF CORRECTION

| | |
|---|---|
| PATENT NO. | : 11,731,879 B2 |
| APPLICATION NO. | : 16/768480 |
| DATED | : August 22, 2023 |
| INVENTOR(S) | : Lewis Dunnigan et al. |

It is certified that error appears in the above-identified patent and that said Letters Patent is hereby corrected as shown below:

In the Specification

Column 9, Lines 3-4: Delete "cornbusted" and replace with -- combusted --

Signed and Sealed this
Seventeenth Day of October, 2023

Katherine Kelly Vidal
*Director of the United States Patent and Trademark Office*